Patented July 13, 1954

2,683,681

UNITED STATES PATENT OFFICE 2,683,681

METHOD OF PURIFYING VITAMIN B12 MATERIAL

Jerry Robert D. McCormick, New City, N. Y., and Siegfried A. Muller, Westwood, N. J., assignors to American Cyanamid Company, New York, N. Y., a corporation of Maine No Drawing. Application November 7, 1951, Serial No. 255,323

8 Claims. (Cl. 167—81)

This invention relates to the purification of vitamin materials and more particularly to the purification of materials having vitamin B12 activity.

The use of liver extracts in the treatment of certain anemias has been known for some time. In recent years a crystalline material having the advantageous properties of liver in relieving certain anemias was isolated and has since become known as vitamin B12. Subsequently, other materials similar to vitamin B12, for instance vitamin B12b, and having substantially the same biological activity have also been isolated. While the exact chemical structure of these materials has not been completely determined, it is known that all are similar cobalt coordination complexes. For instance it is now reasonably certain that vitamin B12b differs from vitamin B12 only by having a hydroxyl group instead of a cyano group in coordination with the cobalt atom. The value and interchangeability of these various vitamin substances in the treatment or prevention of nutritional deficiencies has now been well established and all of such substances are referred to in this specification and claims simply as materials having vitamin B12 activity.

There are many natural sources from which materials having vitamin B12 activity may be obtained. The first and most obvious source is from liver or liver extracts. Recently it has been found that another excellent source of such materials is a fermentation liquor upon which various microorganisms have been grown. Many microorganisms produce small quantities of materials having vitamin B12 activity during fermentation and in fact, some are fermented specifically for the vitamin B12 material produced. An example of such a microorganism is Streptomyces olivaceus. Other microorganisms produce materials having vitamin B12 activity, along with other useful substances for which they are usually grown. For instance the Streptomyces griseus which produce streptomycin and Streptomyces aureofaciens which produce aureomycin also produce small quantities of materials having vitamin B12 activity. Many other microorganisms such as Streptomyces rhimosus, Flavobacterium solare, Clostridium butyricum and Aerobacter aerogenes also produce material having vitamin B12 activity. Since, however, the vitamin B12 material is produced in only small quantities by the above microorganisms, the problem of isolating the same is a very complex one in which many difficulties are encountered.

Several methods have been employed for the isolation of materials having vitamin B12 activity from natural sources. One method which is often employed comprises adsorbing the vitamin substances upon an adsorbent material and subsequently removing the same by elution. A second method which has been employed comprises extracting the source of vitamin B12 material with an organic solvent for the vitamin material. In order for the solvent extraction procedure to be satisfactory, a solvent must be employed which has a high solvent power for the vitamin B12 material and a very low solvent power for the material from which the vitamin material is to be extracted. In other words the solvent must have a high specificity for the vitamin B12 material. In fact, one of the difficulties of such a procedure in the past has been the lack of a suitable solvent having such a high specificity for materials having B12 activity and the new process of this invention is concerned with a procedure which comprises extracting vitamin B12 material from a suitable source with a new solvent having such a high specificity.

According to the new process of this invention vitamin B12 material is extracted from a mixture containing the same with a solvent comprising a nitrolic acid of the following formula:

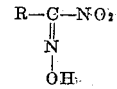

in which R represents a hydrocarbon radical having not more than 6 carbon atoms, for instance a 6 membered ring or a lower alkyl radical. If R represents a lower alkyl radical it is usually advantageous to select the solvent so that R represents a radical having not more than 4 carbon atoms, for instance butyl, propyl or ethyl. If R is to represent a radical containing a 6 membered ring, nitrolic acids of the above formula in which R represents phenyl are preferred. Nitrolic acids of the above formula are known compounds and may be prepared by reacting the appropriate nitro compound with nitrous acid.

The new process of this invention may be applied to any source of vitamin B12 material usually encountered in vitamin B12 purification. It may be applied to solid-liquid extraction of a solid mixture containing vitamin B12 material or to liquid-liquid extraction of an aqueous solution of vitamin B12 material. As the latter procedure is usually more efficient and more conveniently performed, liquid-liquid extraction of an aqueous solution of vitamin B12 material with a nitrolic acid solvent comprises a preferred embodiment of the present invention.

When applied to a solid-liquid extraction procedure, the new process of this invention may be employed in the recovery of materials having vitamin B12 activity from almost any solid mixture of the vitamin material. Illustrative examples of suitable mixtures are the solids obtained from a fermentation liquor or a filter cake obtained in subsequent purification of such solids. The procedure comprises simply dispersing the solid material in the nitrolic acid, allowing a short time for the solvent to leach out the vitamin material and then removing the insoluble material by filtration, decantation or centrifugation. The vitamin material is then recovered from the nitrolic acid solution by procedures which are described in subsequent paragraphs. In the preferred embodiment which comprises liquid-liquid extraction of vitamin B12 material from an aqueous solution of the same, the aqueous solution is simply brought into interfacial contact with the nitrolic acid solvent by any procedure usually employed in liquid-liquid extraction. This results in the transfer of much of the vitamin material to the organic solvent while most of the impurities are retained in the aqueous phase. When the vitamin B12 material is at equilibrium between the aqueous phase and the organic phase, the concentration of the vitamin material in the nitrolic acid will be found to be greater than the concentration of the vitamin material in the aqueous phase, or in other words, the nitrolic acid solvents have a high distribution coefficient for the vitamin material with respect to water. This is one of the advantages of the preferred embodiment of this invention since heretofore the solvents employed in liquid-liquid extraction of vitamin B12 materials have had relatively low distribution coefficients for the vitamin material with respect to water. Also, as mentioned above, the nitrolic acids have a high specificity for vitamin B12 material and thus the degree of purification is very great. This is another advantage of the nitrolic acid solvents over the solvents employed in the prior art since, relatively speaking, the prior art materials had a low specificity for vitamin B12 materials.

The aqueous solution to be treated according to the preferred embodiment of this invention may comprise an aqueous solution prepared from any of the usual sources of material having vitamin B12 activity. For instance, the aqueous solution may be an aqueous extract of liver or it may be a fermentation liquor on which microorganisms such as mentioned above have been fermented. If the aqueous solution comprises a fermentation liquor, it may have been previously treated by various physical and chemical means. For instance, the fermentation liquor may have been chemically treated to convert a large percentage of the vitamin B12$b$ to vitamin B12; it may have been previously treated to break up vitamin-protein conjugates; or it may have been treated to remove the microorganismal debris. The aqueous solution to be treated may also comprise a solution prepared from a vitamin B12 concentrate such as a filter cake obtained after the recovery of antibiotics or a solution prepared by the elution of vitamin B12 material from an adsorbent substance on which it had been previously adsorbed. The aqueous solution of vitamin material to be treated may be dilute or concentrated. For instance, even a saturated solution may be employed although as a general rule concentrations below about 50 gammas of vitamin B12 activity per ml. are preferred. The minimum concentration of vitamin B12 material in the aqueous solution of course depends upon a number of factors but satisfactory recoveries can usually be effected from solutions as dilute as about 0.05 gamma of vitamin B12 activity per ml. In other words, any aqueous solution of vitamin B12 material ordinarily encountered in vitamin B12 purification may be suitably employed in the preferred embodiment of this invention.

The amount of nitrolic acid solvent to be employed depends upon the particular procedure of extraction. If solid-liquid extraction is employed, at least a sufficient amount of solvent should be used to dissolve substantially all of the vitamin B12 material. As vitamin B12 material is quite soluble in the nitrolic acids of this invention, the use of a considerable excess is usually advantageous since otherwise a large percentage of the solvent will be lost by absorption in the insoluble material. As a general rule in liquid-solid extraction, a weight of solvent equal to 1 to 100 times the weight of solid to be extracted will be found to be most satisfactory depending upon the percentage of vitamin B12 material contained in the solid, the solubility of the vitamin material in the particular nitrolic acid employed and the degree of recovery desired. In liquid-liquid extraction the amount of solvent to be employed also depends upon a number of variables as will be obvious to those skilled in the art. Of course the primary factor to be considered in determining the amount of solvent to be employed in a liquid-liquid extraction is the desired degree of recovery. In other words, if one wishes to remove substantially all of the vitamin B12 material from the aqueous solution, a greater quantity of solvent will be required than if one only wishes to remove 50% of the vitamin material. Of course other factors influence the quantity of nitrolic acid to be employed in a liquid-liquid extraction such as the distribution coefficient of the particular nitrolic acid with respect to water and the degree of interfacial contact obtained. Some of the nitrolic acid solvents are somewhat soluble in water and if such a solvent is employed, it must be used in excess of its solubility so that two phases are obtained or else a second organic solvent which is water immiscible, such as chloroform or butanol, should be employed in combination with the nitrolic acid. Of course, other known procedures for decreasing the solubility of an organic liquid in an aqueous solvent may also be employed. As a general rule in liquid-liquid extraction a volume of nitrolic acid equal to about .01 to 100 times that of the volume of the aqueous solution, depending upon the above factors, will be found to be most advantageous.

The time required for extraction is also dependent upon a number of variables as will be obvious to those skilled in the art. For instance in a solid-liquid procedure the time required for reasonable complete extraction depends upon the following factors: solubility of the B12 material in the particular nitrolic acid solvent employed; quantity of solvent employed; degree of contact obtained; and the particular procedure employed for extraction. In liquid-liquid extraction the time required depends upon the above factors and also upon the distribution coefficient with respect to water for the vitamin material of the particular nitrolic acid solvent employed.

The extraction may be performed at practically any convenient temperature as long as it is performed at a temperature at which the nitrolic acid is a liquid. As a general rule, however, temperatures above about 80° C. or 100° C. should not be employed since vitamin B12 material shows instability in the presence of nitrolic acids at high temperatures. Of course in liquid-liquid extraction one cannot conveniently employ temperatures above the boiling point of the aqueous solution or temperatures below which the particular nitrolic acid is a liquid in the presence of water. Generally speaking, temperatures between about 35° C. and 80° C. are preferred, depending upon the type of extraction employed and the particular nitrolic acid used.

It is an advantage of the new process of this invention that liquid-liquid extraction of an aqueous solution can be performed within a relatively wide pH range. In fact, since an extraction can be performed at a neutral pH, hydrogen ion concentration control is usually not necessary. Of course an extraction should not be performed at a pH at which the nitrolic acid is unstable, or in other words, above a pH of about 9.0 or below a pH of about 1.0. The preferred hydrogen ion concentration is between a pH of about 3.0 and 8.0 as the nitrolic acids are more selective within this range and there is no danger that the vitamin B12 material might be partially inactivated.

After the desired degree of contact has been obtained, the solution of the vitamin B12 material in the nitrolic acid is separated and thereafter treated to recover the vitamin B12 material in any desired manner. A satisfactory method of recovering the vitamin material comprises diluting the nitrolic acid solvent with a liquid which is soluble in the nitrolic acid, but which has practically no solvent power for the vitamin B12 material. Examples of suitable liquids for this purpose may be illustrated by the following: benzene, ether, chloroform, higher petroleum ethers, or other organic liquids of this type. After dilution with such a liquid the vitamin B12 material may be removed by procedures such as filtration or the vitamin material may be recovered from the mixture of organic liquids by water extraction.

The preferred method of recovering the vitamin material from the nitrolic acid solvent comprises treating the nitrolic acid solution of vitamin material with an amine according to the procedure of copending application, S. N. 255,324 filed concurrently herewith so that a complex is formed, which complex has a much lower solvent power and distribution coefficient with respect to water for the vitamin B12 material than did the original nitrolic acid. Suitable amines for this purpose are given in the above copending application and include pyridine and substituted pyridines. Since the solvent power for vitamin B materials of the amine-nitrolic acid complex is much lower than the solvent power of the nitrolic acid, a fine precipitate of vitamin B12 material is usually obtained and this may be removed by filtration or centrifugation if desired. However, the distribution coefficient with respect to water for the vitamin material is also much lower for the amine-nitrolic acid complex than for the nitrolic acid alone and once such a complex has been formed the vitamin B12 material may readily be extracted therefrom with an aqueous solvent by liquid-liquid extraction. The last mentioned procedure will usually be found to be the most satisfactory of the two since it results in a greater recovery of the vitamin material than simple filtration. Of course a combination of the two methods can be employed if desired.

Aqueous extraction of vitamin B12 material from an organic solvent having a low distribution coefficient with respect to water may be accomplished by any of the known procedures for liquid-liquid extraction. The amount of water to be employed obviously depends upon a number of factors, for instance the degree of interfacial contact obtained, the distribution coefficient of the organic solvent with respect to water, and the degree of recovery desired. As a general rule a volume of water equal to 10% to 50% of the volume of organic solvent in a two or three stage countercurrent extraction system will be found to be satisfactory. Of course, if one is working with small volumes, satisfactory extraction can usually be obtained by simply adding water to a vessel containing the organic solution of vitamin B12 and thoroughly stirring the two liquids.

The vitamin B12 material recovered by any of the above procedures will be found to be in a much purer state than was the starting material. In fact, the vitamin B12 material thus recovered is usually pure enough that it may be used for oral administration without further modification. If desired, it may be further purified for parenteral use by various known purification procedures.

The invention will be more particularly illustrated by the following specific examples in which all parts are by weight unless otherwise indicated.

Example I

A 1 part by volume sample of an aqueous solution of crude vitamin B12 material assaying 40 gammas of B12 per ml. was shaken with 0.1 part by volume of molten propane nitrolic acid. The organic phase was separated and was found to contain 338 gammas of B12 per ml. The vitamin B12 material was recovered from the nitrolic acid by dilution with benzene.

Example II

A 10 part by volume sample of crude vitamin B12 concentrate assaying 21.5 gammas per ml. and having a dry basis potency of 168 gammas per gram was shaken with 1 part by volume of molten propane nitrolic acid. The nitrolic acid phase was separated and found to contain 205 gammas per ml. The vitamin B12 material was recovered from the nitrolic acid solvent by dilution with benzene and the thus recovered material was found to have a purity of 830 gammas per gram.

Example III

A sample of a pink solution containing 40 gammas of B12 per ml. was diluted with an equal volume of saturated brine and shaken with a small volume of ethane nitrolic acid. Substantially all the pink color entered the organic phase. The colorless aqueous phase was removed and replaced by an equal volume of distilled water. When a volume of 2-methyl-5-ethylpyridine equal to twice the volume of nitrolic acid was added and the mixture shaken, all of the pink color entered the aqueous phase.

We claim:

1. The method of purifying vitamin B12 material which comprises extracting a source of said material with a liquid nitrolic acid solvent of the class represented by the formula:

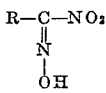

in which R represents a hydrocarbon radical having not more than 6 carbon atoms, said hydrocarbon radical being selected from the group consisting of aromatic and lower alkyl radicals; and recovering the vitamin B12 material from said nitrolic acid solvent by diluting said solvent with an organic liquid soluble therein having substantially no solvent power for the vitamin B12 material.

2. A method of purifying vitamin B12 materials which comprises bringing into interfacial contact an aqueous solution containing materials having vitamin B12 activity and a nitrolic acid solvent of the class represented by the formula:

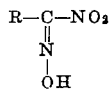

in which R represents a hydrocarbon radical having not more than 6 carbon atoms, said hydrocarbon radical being selected from the group consisting of aromatic and lower alkyl radicals; separating the nitrolic acid solution of vitamin B12 material and recovering the vitamin material from said nitrolic acid solvent by diluting said solvent with an organic liquid soluble therein having substantially no solvent power for the vitamin B12 material.

3. The method of claim 2 wherein said aqueous solution contains from 0.05 to 50 gammas of vitamin B12 activity per ml.

4. The method of claim 2 wherein said extraction is performed at a hydrogen ion concentration between a pH of about 3.0 and 8.0.

5. The method of purifying vitamin B12 material which comprises extracting a source of said material with a liquid nitrolic acid solvent of the class represented by the formula:

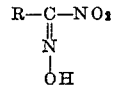

in which R represents a lower alkyl radical and recovering the vitamin B12 material from said nitrolic acid solvent by diluting said solvent with an organic liquid soluble therein having substantially no solvent power for the vitamin B12 material.

6. The method of claim 5 wherein said source of vitamin material comprises *Streptomyces aureofaciens* fermentation liquor.

7. The method of purifying vitamin B12 materials which comprises bringing into interfacial contact an aqueous solution of impure vitamin B12 material with propane nitrolic acid, said aqueous solution containing between about 0.05 and 50 gammas of vitamin B12 activity per ml. and said interfacial contact being effected at a temperature between 35° C. and 80° C. and at a hydrogen ion concentration of about pH 3.0 to 8.0, separating the nitrolic acid solution from the aqueous phase and diluting said nitrolic acid solution with an organic liquid soluble therein having substantially no solvent power for the vitamin B12 material.

8. The method of purifying vitamin B12 materials which comprises bringing into interfacial contact an aqueous solution of impure vitamin B12 material with ethane nitrolic acid, said aqueous solution containing between about 0.05 and 50 gammas of vitamin B12 activity per ml. and said interfacial contact being effected at a temperature between 35° C. and 80° C. and at a hydrogen ion concentration of about pH 3.0 to 8.0, separating the nitrolic acid solution from the aqueous phase and diluting said nitrolic acid solution with an organic liquid soluble therein having substantially no solvent power for the vitamin B12 material.

References Cited in the file of this patent

UNITED STATES PATENTS

| Number | Name | Date |
| --- | --- | --- |
| 2,530,416 | Wolf | Nov. 21, 1950 |
| 2,563,794 | Rickes | Aug. 7, 1951 |

OTHER REFERENCES

Fantes: Proceedings of the Royal Society (1950), pages 592 to 598.